United States Patent
Ren et al.

(10) Patent No.: US 12,223,275 B2
(45) Date of Patent: Feb. 11, 2025

(54) METHOD OF TRAINING MODEL, DEVICE, AND STORAGE MEDIUM

(71) Applicant: Beijing Baidu Netcom Science Technology Co., Ltd., Beijing (CN)

(72) Inventors: Weijie Ren, Beijing (CN); Jianfei Wang, Beijing (CN); Cheng Peng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 612 days.

(21) Appl. No.: 17/559,623

(22) Filed: Dec. 22, 2021

(65) Prior Publication Data
US 2022/0114343 A1 Apr. 14, 2022

(30) Foreign Application Priority Data
Dec. 25, 2020 (CN) .......................... 202011573205.0

(51) Int. Cl.
*G10L 15/22* (2006.01)
*G06F 40/295* (2020.01)
(Continued)

(52) U.S. Cl.
CPC ........... *G06F 40/295* (2020.01); *G06N 3/044* (2023.01); *G06N 3/08* (2013.01); *G06F 16/3329* (2019.01);
(Continued)

(58) Field of Classification Search
CPC ....... G10L 15/063; G10L 15/22; G10L 16/35; G10L 16/3329
See application file for complete search history.

(56) References Cited

U.S. PATENT DOCUMENTS

2014/0025705 A1  1/2014  Barve et al.
2018/0233128 A1* 8/2018  Chen ....................... G10L 15/22
(Continued)

FOREIGN PATENT DOCUMENTS

CN   108363690 A   8/2018
CN   110211573 A   9/2019
(Continued)

OTHER PUBLICATIONS

Official Communication issued in corresponding Chinese Patent Application No. 202011573205.0, mailed on Jan. 30, 2024.
(Continued)

*Primary Examiner* — Feng-Tzer Tzeng
(74) *Attorney, Agent, or Firm* — Keating & Bennett, LLP (57) ABSTRACT

A method of training a model, an electronic device, and a storage medium are provided, which relate to a field of artificial intelligence, and in particular to a field of reinforcement learning, NLP, etc. The method includes: acquiring a dialogue information; obtaining a predicted information based on the dialogue information by using a first intention recognition model, a first recurrent neural network and a first named entity recognition model; obtaining a machine behavior information based on the predicted information by using a first behavior decision model; acquiring a feedback information for the machine behavior; storing at least one of the predicted information, the machine behavior information, or the feedback information as training data in a database; and performing a model optimization training online based on the training data by using a reinforcement learning algorithm, in response to an amount of the training data reaching a preset data amount.

13 Claims, 5 Drawing Sheets

(51) Int. Cl.
*G06N 3/044* (2023.01)
*G06N 3/08* (2023.01)
*G06F 16/35* (2019.01)
*G10L 15/06* (2013.01)

(52) U.S. Cl.
CPC ............ *G06F 16/35* (2019.01); *G10L 15/063* (2013.01); *G10L 15/22* (2013.01)

(56) References Cited

U.S. PATENT DOCUMENTS

| | | |
|---|---|---|
| 2019/0385051 A1 | 12/2019 | Wabgaonkar et al. |
| 2020/0279002 A1 | 9/2020 | Kim et al. |
| 2021/0034925 A1 | 2/2021 | Ogata |
| 2021/0398517 A1 | 12/2021 | Iwase et al. |

FOREIGN PATENT DOCUMENTS

| | | | | |
|---|---|---|---|---|
| CN | 110390108 A | | 10/2019 | |
| CN | 110321418 B | * | 6/2021 | ......... G06F 16/3329 |
| CN | 114625878 A | * | 6/2022 | |
| JP | 2015-528956 A | | 10/2015 | |
| JP | 2019-164626 A | | 9/2019 | |
| JP | 2020-140210 A | | 9/2020 | |
| WO | 2020/105302 A1 | | 5/2020 | |
| WO | 2020/177282 A1 | | 9/2020 | |

OTHER PUBLICATIONS

Official Communication issued in corresponding Chinese Patent Application No. 202011573205.0, mailed on Apr. 19, 2023.
Official Communication issued in corresponding European Patent Application No. 21216758.9, mailed on May 2, 2023.
"Learning through human feedback", https://www.deepmind.com/blog/learning-through-human-feedback, Jun. 12, 2017, pp. 1-8.
Abdulrahman et al., "A Survey on Federated Learning: The Journey From Centralized to Distributed On-Site Learning and Beyond", IEEE Internet of Things Journal, vol. 8, No. 7, Oct. 12, 2020, pp. 5476-5497.
Official Communication issued in European Patent Application No. 21216758.9-1203, mailed on May 30, 2022.
Official Communication issued in corresponding Japanese Patent Application No. 2021-104044, mailed on Aug. 2, 2022.

* cited by examiner

METHOD OF TRAINING MODEL, DEVICE, AND STORAGE MEDIUM

CROSS-REFERENCE TO RELATED APPLICATIONS

This application is claims priority to Chinese Application No. 202011573205.0 filed on Dec. 25, 2020, which is incorporated herein by reference in its entirety.

TECHNICAL FIELD

The present disclosure relates to a field of computer technology, in particular to a field of artificial intelligence, such as reinforcement learning, NLP (Natural Language Processing) and other fields.

BACKGROUND

With a development of science and technology, many products of artificial intelligence are gradually used in the society. Dialogue systems, as the most direct application of artificial intelligence, have been widely valued in academia world and industry world.

SUMMARY

According to the embodiments of the present disclosure, a method of training a model, a device, and a storage medium.

According to an aspect of the present disclosure, there is provided a method of training a model, including: acquiring a dialogue information input by a user in a human-machine interaction process; obtaining a corresponding predicted information based on the dialogue information by using a first intention recognition model, a first recurrent neural network and a first named entity recognition model, wherein the predicted information includes: a user intention information, a dialogue state information and an entity information; obtaining a corresponding machine behavior information based on the predicted information by using a first behavior decision model, in order for a machine to perform a corresponding machine behavior in the human-machine interaction process based on the machine behavior information; acquiring a feedback information input by the user for the machine behavior; storing at least one of the predicted information, the machine behavior information, or the feedback information as training data in a database; and performing a model optimization training online based on the training data in the database by using a reinforcement learning algorithm, in response to an amount of the training data in the database reaching a preset data amount.

According to another aspect of the present disclosure, there is provided an electronic device, including at least one processor; and a memory communicatively connected to the at least one processor, wherein the memory stores instructions executable by the at least one processor, and the instructions, when executed by the at least one processor, cause the at least one processor to implement the method of the embodiments of the present disclosure.

According to another aspect of the present disclosure, there is provided a non-transitory computer-readable storage medium having computer instructions stored thereon, wherein the computer instructions are configured to cause a computer to implement the method of the embodiments of the present disclosure.

It should be understood that the content described in the summary is not intended to limit the critical or important features of the embodiments of the present disclosure, nor is it intended to limit the scope of the present disclosure. Other features of the present disclosure will be easily understood by the following description.

BRIEF DESCRIPTION OF THE ACCOMPANYING DRAWINGS

The drawings are used to better understand the solution and do not constitute a limitation to the present disclosure, in which.

DETAILED DESCRIPTION

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

In a dialogue system, dialogue content is usually divided into a limited number of dialogue states, and some rules are defined to determine conditions for entering these different states. In a dialogue process, the dialogue system may obtain a user intention and an entity involved through natural language processing methods such as machine learning or artificially defined rules. Then a following dialogue state is triggered according to a previous dialogue state, the intention and the entity. Finally, some feedbacks are made according to the following dialogue state by using a system decision model. In implementing the dialogue system, the dialogue system is usually divided into several modules based on the above process. The implementation of these modules (or models) is usually based on offline data training or through the artificially defined rules. However, when the models trained based on the offline data are applied to the dialogue system, parameters of all models have been fixed and cannot be updated after the dialogue system is online. These models based on offline data training may deviate from an actual dialogue of online users, resulting in a failure to guarantee an effectiveness of the model.

In addition, training multiple modules (or models) such as a user language understanding module and a system feedback module included in the dialogue system based on the offline data requires manually labeling the offline data, leading to much labeling costs. Moreover, different people may have different criterions in labeling, which may lead to large labeling errors, thus reducing an accuracy of the model.

According to the embodiments of the present disclosure, a method of training a model is provided. For a data model used in the dialogue system, a corresponding primary data model may be trained based on some offline data. After the primary data model is published and used, an optimization training may be performed online on the primary data model based on online data by using a reinforcement learning algorithm. The online optimization training may be repeated periodically. After using the online data for model optimization training, the dialogue system may be closer to an actual use scenario of the user more realistically and effectively, thereby obtaining better dialogue effects. Moreover, in the process of model optimization training, the reinforcement learning algorithm may train and update the dialogue system in time in an human-machine interaction environment, and no artificially built tag data (such as data labeling) is needed. This ensures that the dialogue system is more accurate. The present disclosure will be described in detail in combination with specific embodiments.

A system architecture of a method and apparatus of training a model suitable for the embodiments of the present disclosure is described below.

Figure 1:
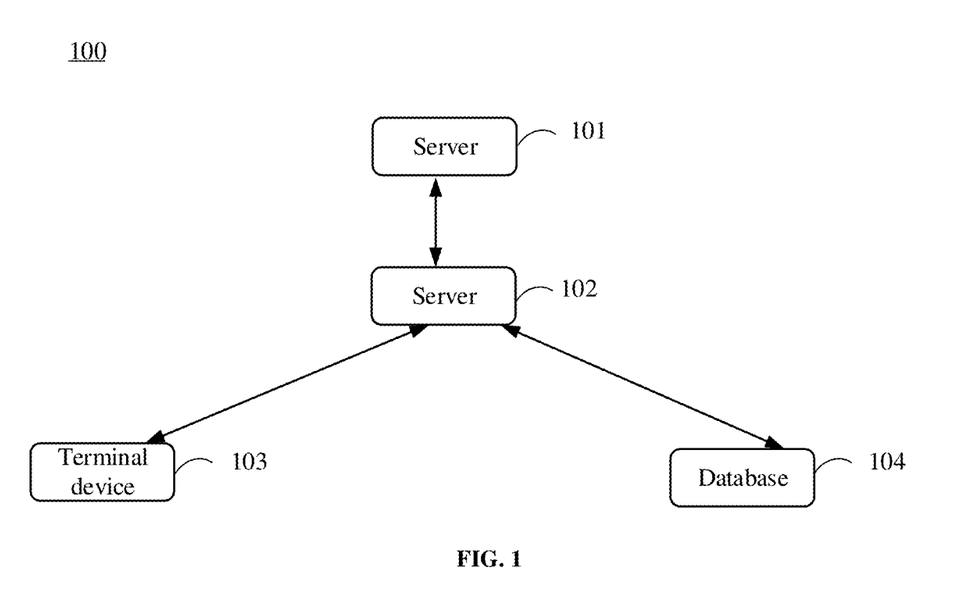
FIG. 1 shows an exemplary system architecture of a method and apparatus of training a model suitable for the embodiments of the present disclosure.

FIG. 1 illustrates a system architecture of a method and apparatus of training a model suitable for embodiments of the present disclosure. It should be noted that FIG. 1 only shows an example of the system architecture that may be applied to the embodiments of the present disclosure to help those skilled in the art understand the technical content of the present disclosure, but it does not mean that the embodiments of the present disclosure may not be used in other environments or scenarios.

As shown in FIG. 1, the system architecture 100 may include a server 101, a server 102, a terminal device 103, and a database 104.

Specifically, some primary models, such as a primary intention recognition model, a primary recurrent neural network and a primary named entity recognition model, may be trained on the server 101 by using some offline data. The primary models may be used in the dialogue system, and may be published to the server 102.

In the human-machine interaction process of the user using the terminal device 103, the server 102 may acquire a dialogue information input by the user in the human-machine interaction process, and obtain a corresponding predicted information based on the acquired dialogue information by using corresponding primary models such as the primary intention recognition model, the primary recurrent neural network and the primary named entity recognition model. The predicted information may include: a user intention information, a dialogue state information and an entity information. Further, a corresponding machine behavior information may be obtained based on the predicted information by using the primary behavior decision model, so that a machine (i.e. the terminal device 103) performs a corresponding machine behavior in the human-machine interaction process based on the machine behavior information. Furthermore, the server 102 may store at least one of the predicted information, the machine behavior information, or a feedback information as training data in the database 104, and perform a model optimization training online based on the training data in the database 104 by using a reinforcement learning algorithm to obtain an optimized data model, in response to the training data in the database 104 reaching a preset data amount. Moreover, the server 102 may periodically perform an optimization training on the models used in the dialogue system based on newly acquired training data obtained by the database 104 according to the logic above.

In addition, the method of training a model provided by the embodiments of the present disclosure may be implemented on the server 102 and/or on the terminal device 103 communicatively connected to the server 102, which is not limited by the embodiments of the present disclosure.

It should be understood that the number of servers, terminal devices and databases in FIG. 1 is only schematic. There may be any number of servers, terminal devices and databases as implementation needed.

Application scenarios of the method and apparatus of training a model suitable for the embodiments of the present disclosure are described below.

It should be understood that the method and apparatus of training a model provided by the embodiments of the present disclosure may be applied to any dialogue system involving human-machine interaction or machine-machine interaction, which is not limited by the embodiments of the present disclosure.

According to the embodiments of the present disclosure, a method of training a model is provided.

Figure 2:
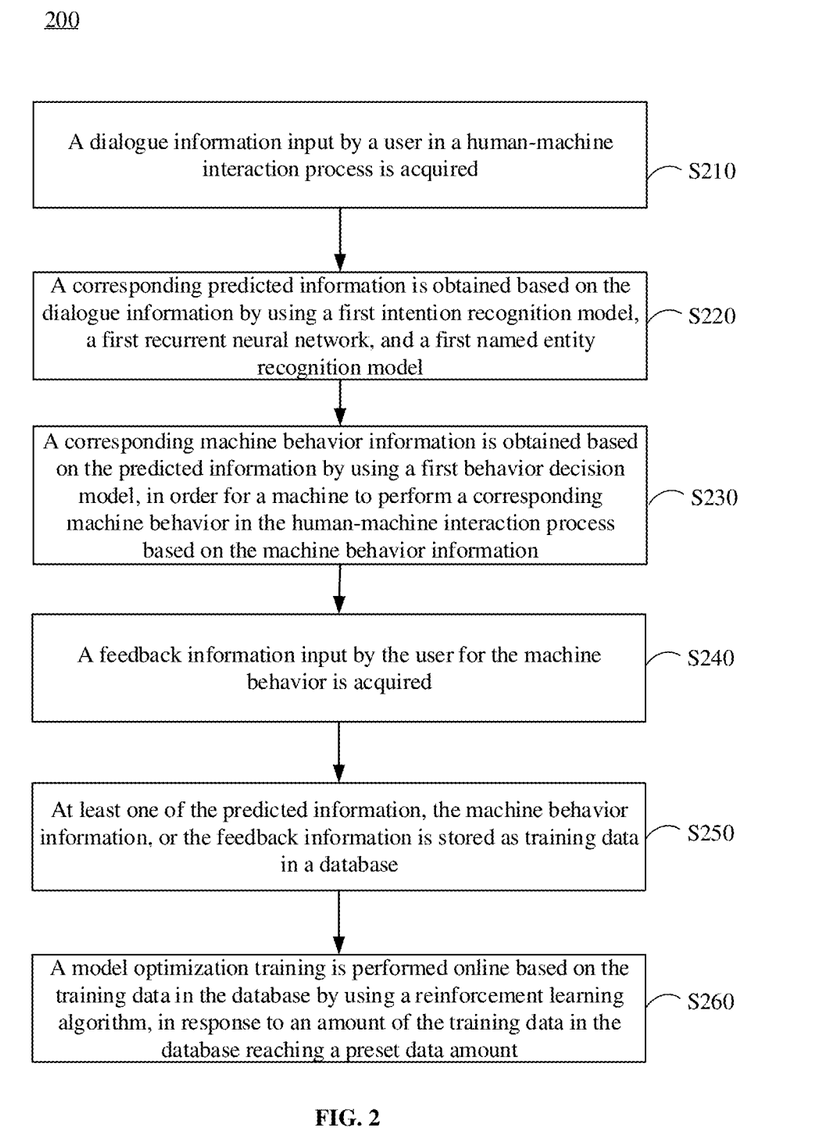
FIG. 2 shows an exemplary flowchart of a method of training a model according to the embodiments of the present disclosure.

FIG. 2 shows an exemplary flowchart of a method of training a model according to the embodiments of the present disclosure.

As shown in FIG. 2, the method 200 may include operations S210 to S260.

In operation S210, a dialogue information input by a user in a human-machine interaction process is acquired.

In operation S220, a corresponding predicted information is obtained based on the dialogue information by using a first intention recognition model, a first recurrent neural network and a first named entity recognition model, and the predicted information includes: a user intention information, a dialogue state information and an entity information.

In operation S230, a corresponding machine behavior information is obtained based on the predicted information by using a first behavior decision model, in order for a machine to perform a corresponding machine behavior in the human-machine interaction process based on the machine behavior information.

In operation S240, a feedback information input by the user for the machine behavior is acquired.

In operation S250, at least one of the predicted information, the machine behavior information, or the feedback information is stored as training data in a database.

In operation S260, a model optimization training is performed online based on the training data in the database by using a reinforcement learning algorithm, in response to an amount of the training data in the database reaching a preset data amount.

It should be noted that in operation S210, the dialogue information includes dialogue content input by the user in the human-machine interaction process. It should be noted that the dialogue information in the embodiments is not dialogue information for a specific user and does not reflect the personal information of the specific user. In operation S220 and operation S230, the first intention recognition model, the first recurrent neural network, the first named entity recognition model and the first behavior decision model may be the primary data models obtained by the offline training using history dialogue data, or optimized data models obtained after one or more rounds of the online reinforcement learning based on the primary data models above, which is not limited by the embodiments of the present disclosure.

In addition, in operation S230, after the corresponding machine behavior information is obtained based on the predicted information by using the first behavior decision model, the machine behavior information may be transmitted to the terminal device used by the user for the human-machine interaction, and the terminal device performs the corresponding machine behavior based on the machine behavior information, as a feedback for the dialogue content input by the user.

In some embodiments of the present disclosure, in a man-machine dialogue process, according to the operations S210 to S230, after the machine performs a series of machine behaviors, the user may provide some feedback information according to whether the system has finally completed a goal of the user dialogue or not. For example, if the goal of the user dialogue is finally completed when the dialogue stops, then the user may set a current reward $r_t$ to 10. If no goal is completed when the dialogue stops, then the user may set the current reward $r_t$ to −10. In addition, if the user continues to inquire when the dialogue has stopped and the goal of the user dialogue goal is finally completed, then the current reward $r_t$ may be reset to −1, so that the user may inquire as few times as possible. The reward $r_t$ is the feedback information input by the user for the machine behavior.

It should be noted that in the embodiments of the present disclosure, the feedback information is regarded as a part of the training data, so that the training data required by the training models no longer depends on the manual labeling. Thus, the costs of the manual labeling may be saved. In addition, since the manual labeling is no longer required, the labeling errors caused by the manual labeling may be eliminated, and the accuracy of the model may be improved.

Through the embodiments of the present disclosure, for each data model used in the dialogue system, the corresponding primary data model may be trained based on some offline data. After the primary data model is published and used, the optimization training may be performed online on the primary data model based on the online data by using the reinforcement learning algorithm. The online optimization training may be repeated periodically. After using the online data for model optimization training, the dialogue system may be closer to an actual use scenario of the user more realistically and effectively, thereby obtaining better dialogue effects, that is ensuring the effectiveness of the model. Moreover, in the process of model optimization training, the reinforcement learning algorithm is used for the model optimization training, without spending time on the data labeling, so that the dialogue system may be trained and updated in time in the human-machine interaction process, that is, the timeliness of model update may be ensured. Additionally, the reinforcement learning algorithm for model optimization training needs no artificially built label data (such as data labeling), which may not only reduce a labor cost of data labeling, but also prevent the accuracy of the model from an influence of a manual labeling level. In addition, since the model optimization training is based on the online data, that is, real-time data, the accuracy of the training data and the accuracy of the model may be ensured.

As optional embodiments, the performing a model optimization training online based on the training data in the database by using a reinforcement learning algorithm, for example, may include following operations.

Some training data is selected randomly from the database.

The model optimization training is performed online based on the training data selected randomly, by using the reinforcement learning algorithm.

It should be noted that in the embodiments of the present disclosure, a calculation amount in the process of model optimization training may be reduced by randomly selecting some of the training data rather than all of the data from the database above for the model optimization training, and then the efficiency of the model optimization training may be improved.

In addition, in the embodiments of the present disclosure, a reinforcement algorithm may be used as the reinforcement learning algorithm, and the reinforcement algorithm may be used for the online optimization training of relevant models.

In some embodiments of the present disclosure, optimization methods such as back propagation and gradient descent may be used in the process of model optimization training. It should be understood that the back propagation training method aims to reduce a loss value (i.e. loss function). The gradient descent method uses a random gradient descent algorithm to make parameters of the model move in a direction opposite to the gradient, that is, a direction of reducing a total loss, so as to update the parameters.

In addition, in other embodiments of the present disclosure, optimization methods such as momentum optimizer and adam optimizer may be used for the model optimization training.

As other optional embodiments, the performing a model optimization training online based on the training data in the database by using a reinforcement learning algorithm, for example, may include following operations. The model optimization training is performed online on at least one of the first intention recognition model, the first recurrent neural network, the first named entity recognition model, or the first behavior decision model, based on the training data in the database by using the reinforcement learning algorithm.

In some embodiments of the present disclosure, the optimization training may be performed on all the first intention recognition model, the first recurrent neural network, the first named entity recognition model and the first behavior decision model used in the dialogue system based on the online data.

In other embodiments of the present disclosure, the optimization training may be performed on only some models used in the dialogue system, such as the first intention recognition model, the first recurrent neural network and the first behavior decision model based on online data.

It should be understood that after this model optimization training, for the first intention recognition model, the first recurrent neural network, the first named entity recognition model and the first behavior decision model, a second intention recognition model, a second recurrent neural network, a second named entity recognition model and a second behavior decision model may be obtained respectively. Furthermore, after a following model optimization training, for the second intention recognition model, the second recurrent neural network, the second named entity recognition model and the second behavior decision model, a third intention recognition model, a third recurrent neural network, a third named entity recognition model and a third behavior decision model may be obtained respectively. Similarly, an N-th intention recognition model, an N-th recurrent neural network, an N-th named entity recognition model and an N-th behavior decision model may be obtained by repeating the operations above.

Further, as optional embodiments, the method may further include at least one of following operations.

An optimization training is performed on a fully connected layer of the first intention recognition model, in performing the model optimization training on the first intention recognition model.

An optimization training is performed on a fully connected layer of the first behavior decision model, in performing the model optimization training on the first behavior decision model.

In the embodiments of the present disclosure, the optimization training is performed on the fully connected layer of the first intention recognition model, that is, only the fully connected layer of the model is controlled to adjust parameters during the process of optimization training, and parameters of other layers are controlled to remain unchanged. Through the optimization training on the fully connected layer, a recognition of intention features may be optimized.

Similarly, in the embodiments of the present disclosure, the optimization training is performed on the fully connected layer of the first behavior decision model, that is, only the fully connected layer of the model is controlled to adjust parameters during the process of optimization training, and parameters of other layers are controlled to remain unchanged. Through the optimization training of the fully connected layer, a recognition of machine behavior features may be optimized.

As optional embodiments, the obtaining a corresponding predicted information based on the dialogue information by using a first intention recognition model, a first recurrent neural network and a first named entity recognition model may include at least one of following operations.

A probability distribution of a user intention is obtained based on the dialogue information by using the first intention recognition model.

A probability distribution of a dialogue state is obtained based on the dialogue information by using the first recurrent neural network.

A corresponding entity vector is obtained based on the dialogue information by using the first named entity recognition model.

It should be noted that in the process of implementing the embodiments of the present disclosure, the inventor found that: the dialogue system may be divided into a user language understanding module, a dialogue status updating module and a system feedback module, but errors generated in a previous module will be accumulated in a following module, thus leading to a poor final result. For example, an error occurred during entity and intention recognition through the user language understanding module may directly lead to the total result wrong, while the following dialogue status updating module and system feedback module may not correct this error. This is because the user language understanding module outputs a user intention, the dialogue state updating model outputs a dialogue state, and the system feedback outputs a machine behavior that the machine should perform.

In the embodiments of the present disclosure, the probability distribution of the user intention is obtained by using the first intention recognition model, so that there is no error accumulation of the user intention. Similarly, in the embodiments of the present disclosure, the probability distribution of the dialogue state is obtained by using the first recurrent neural network, so that there is no error accumulation of the dialogue state. Similarly, in the present disclosure, the entity vector is obtained by using the first named entity recognition model, so that there is no error accumulation of the entity recognition.

Similarly, as optional embodiments, the obtaining a corresponding machine behavior information based on the predicted information, by using a first behavior decision model, for example, may include a following operation. A probability distribution of the corresponding machine behavior is obtained based on the predicted information by using the first behavior decision model. Therefore, there is no error accumulation of the machine behavior decision.

Figure 3:
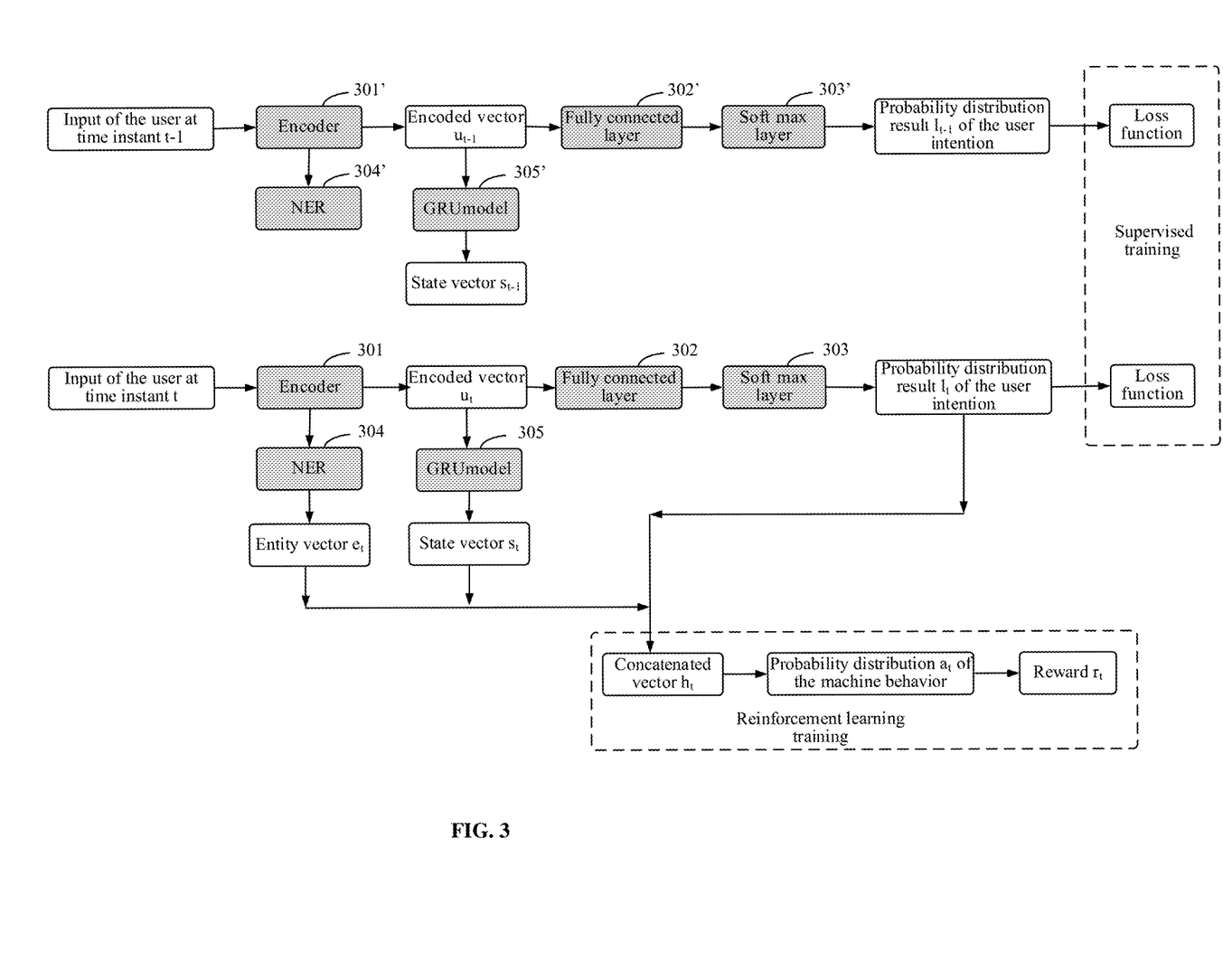
FIG. 3 shows a schematic diagram of training a model according to the embodiments of the present disclosure.

Exemplarily, FIG. 3 shows a schematic diagram of training a model according to the embodiments of the present disclosure. As shown in FIG. 3, the offline training may be performed first according to the history dialogue data of the user, so as to obtain the primary data models, and then the model optimization training may be performed online on the primary data models trained offline according to the online dialogue data obtained in real time.

As shown in FIG. 3, for a dialogue content input by the user at moment t-1, an entity recognition may be performed through NER 304' (a pre-defined Named Entity Recognition model) to obtain a corresponding entity information and store the corresponding entity information in an entity database. In addition, some critical entity information related to user semantics may be identified by template matching and keyword matching. Furthermore, the critical entity information may be encoded by an encoder 301' to obtain a corresponding encoded vector $u_{t-1}$. It should be noted that in the embodiments of the present disclosure, the encoder 301' may be any one of a pre-trained model (such as BERT (Bidirectional Encoder Representation from Transformers) model), a CNN (Convolutional Neural Networks), a LSTM (Long Short-Term Memory) network, etc.

Further, the encoded vector $u_{t-1}$ may be input to a fully connected layer 302' of the user intention recognition model, and then an output result of the fully connected layer 302' may be input to a soft max layer 303' of the user intention recognition model, so as to output a probability distribution result $l_{t-1}$ of the user intention. Furthermore, a cross entropy is calculated between the output result of the soft max layer 303', i.e. an actual predicted result and an expected predicted result. Then the cross entropy obtained is used as a loss function for a supervised training of the model, so that a primary data model (such as a BERT model in (2) below and a fully connected layer in (3) below) may be obtained. Furthermore, the primary data model may be published online.

In addition, the encoded vector $u_{t-1}$ may further be input into a GRU (Gated Recurrent Unit) model 305', so as to output a state vector $s_{t-1}$ representing a dialogue state at moment t-1.

Further, as shown in FIG. 3, a processing flow of a reinforcement learning training for an input of the user at moment t is as follows.

(1) An entity recognition may be performed through NER 304 to obtain a corresponding entity information and update the entity database.

(2) Some critical entity information related to user semantics may be identified by template matching and keyword matching. Furthermore, the critical entity information may be encoded by an encoder 301 to obtain a corresponding encoded vector $u_t$. It should be noted that in the embodiments of the present disclosure, the encoder 301 may be any one of a pre-trained model (such as a Bert model), a convolutional neural network (CNN), a long-term short-term memory (LSTM) network, etc.

(3) The encoded vector $u_t$ may be input to a fully connected layer 302 of an initial intention recognition model, and then an output result of the fully connected layer 302 may be input to a soft max layer 303 of the initial intention recognition model, so as to obtain a probability distribution result $l_t$ of the user intention. It should be noted that a cross entropy may be calculated between the output result of the soft max layer 303, i.e. an actual predicted result and an expected predicted result. Then the cross entropy obtained may be used as a loss function for the supervised training of the model.

(4) The encoded vector $u_t$ in (2) is calculated using a GRU model 305, so as to output a state vector $s_t$ representing a dialogue state at moment t.

(5) A one-hot encoding is performed on the entity information identified in (1), so that the entity information is expressed as an entity vector $e_t$.

(6) A concatenate operation is performed on the $e_t$, $s_t$ and $l_t$ to obtain a concatenated vector $h_t$.

(7) The concatenated vector $h_t$ is input into a fully connected layer of an initial behavior decision model, and an output result of the fully connected layer is input into a soft max layer of the initial behavior decision model to obtain a final probability distribution $a_t$ of the machine behavior.

It should be noted that the probability distribution $a_t$ of the machine behavior may be transmitted to the terminal device used by the user for the human-machine interaction, so that the terminal device may perform the corresponding machine behavior based on the probability distribution $a_t$.

(8) In addition, it should be noted that for the machine behavior performed by the machine, if the user thinks that an expected dialogue goal has been achieved when the dialogue stops, for example, a reward $r_t$ may be set to 10. If the user thinks that no goal is achieved when the dialogue stops, for example, the reward $r_t$ may be set to −10. In addition, if the user continues to inquire when the dialogue has stopped, then the reward may be reset to −1, so that the user may inquire as few times as possible.

(9) ($h_t$, $a_t$, $r_t$) is stored into the training database.

(10) Some training data may be randomly selected from the training database in response to the training data in the database reaching a preset data amount, and the reinforcement algorithm for reinforcement learning is used to perform a back-propagation update (i.e. an update using back propagation and gradient descent methods) on the BERT model in (2), the GRU model in (4), the fully connected layer in (3) and (7).

(11) The online models are updated as models after the reinforcement learning training.

It should be noted that the reinforcement learning training may be performed online repeatedly by repeating (9) to (11).

Through the embodiments of the present disclosure, the user intention, the entity information and the state information are all used as training data for model training and predicting. A complete probability distribution may be obtained when predicting a model. Thus, even if there is a deviation in identifying the user intention or the entity information, the dependence on a single user intention or a single entity may be reduced. And an impact of a single module on the whole dialogue system may further be reduced.

According to the embodiments of the present disclosure, an apparatus of training a model is further provided in the present disclosure.

Figure 4:
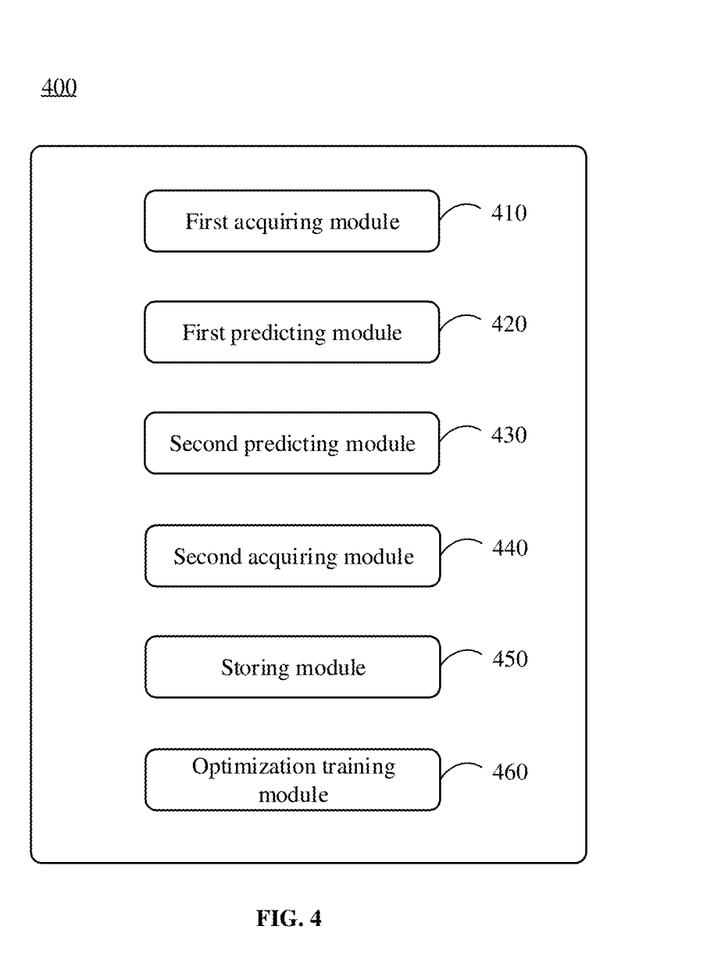
FIG. 4 shows an exemplary block diagram of an apparatus of training model according to some embodiments of the present disclosure.

FIG. 4 shows an exemplary block diagram of an apparatus of training model according to some embodiments of the present disclosure.

As shown in FIG. 4, the apparatus 400 may include a first acquiring module 410, a first predicting module 420, a second predicting module 430, a second acquiring module 440, a storing module 450 and an optimization training module 460.

The first acquiring module 410 is used to acquire a dialogue information input by a user in a human-machine interaction process.

The first predicting module 420 is used to obtain a corresponding predicted information based on the dialogue information by using a first intention recognition model, a first recurrent neural network and a first named entity recognition model, and the predicted information includes: a user intention information, a dialogue state information and an entity information.

The second predicting module 430 is used to obtain a corresponding machine behavior information based on the predicted information by using a first behavior decision model, in order for a machine to perform a corresponding machine behavior in the human-machine interaction process based on the machine behavior information.

The second acquiring module 440 is used to acquire a feedback information input by the user for the machine behavior.

The storing module 450 is used to store at least one of the predicted information, the machine behavior information, or the feedback information as training data in a database.

The optimization training module 460 is used to perform a model optimization training online based on the training data in the database by using a reinforcement learning algorithm, in response to an amount of the training data in the database reaching a preset data amount.

As optional embodiments, the optimization training module includes a selecting unit and a first optimization training unit. The selecting unit is used to select training data randomly from the database. The first optimization training unit is used to perform the model optimization training online based on the training data selected randomly, by using the reinforcement learning algorithm.

As optional embodiments, the optimization training module is further used to perform the model optimization training online on at least one of the first intention recognition model, the first recurrent neural network, the first named entity recognition model, or the first behavior decision model, based on the training data in the database by using the reinforcement learning algorithm.

As optional embodiments, the optimization training module includes at least one of a second optimization training unit and a third optimization training unit. The second optimization training unit is used to perform an optimization training on a fully connected layer of the first intention recognition model, in performing the model optimization training on the first intention recognition model. The third optimization training unit is used to perform an optimization training on a fully connected layer of the first behavior decision model, in performing the model optimization training on the first behavior decision model.

As optional embodiments, the first predicting module includes at least one of a first predicting unit, a second predicting unit, or a third predicting unit. The first predicting unit is used to obtain a probability distribution of a user intention based on the dialogue information by using the first intention recognition model. The second predicting unit is used to obtain a probability distribution of a dialogue state based on the dialogue information by using the first recurrent neural network. The third predicting unit is used to obtain a corresponding entity vector based on the dialogue information by using the first named entity recognition model.

As optional embodiments, the second predicting module is further used to obtain a probability distribution of the corresponding machine behavior based on the predicted information by using the first behavior decision model.

It should be noted that the apparatus embodiment part of the present disclosure is the same as or similar to the method embodiment part of the present disclosure. Description of the apparatus embodiment part may refer to the method embodiment part, which will not be repeated here.

Collecting, storing, using, processing, transmitting, providing, and disclosing etc. of the personal information of the user involved in the present disclosure all comply with the relevant laws and regulations, and do not violate the public order and morals.

According to the embodiments of the present disclosure, an electronic device, a readable storage medium and a computer program product are further provided in the present disclosure.

Figure 5:
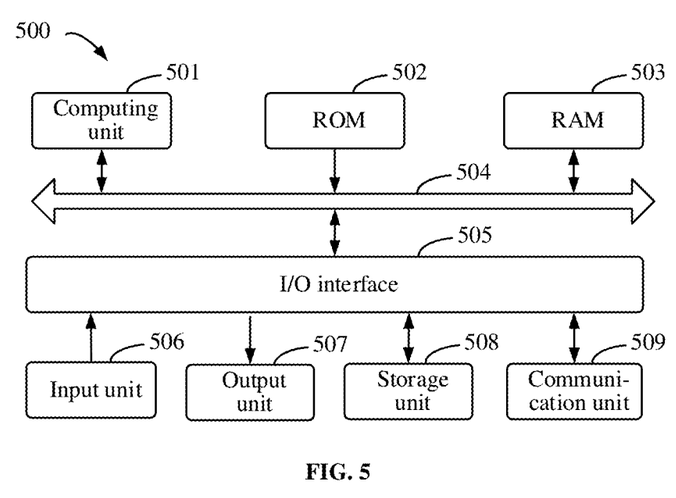
FIG. 5 shows an exemplary block diagram of an electronic device for implementing a method and apparatus of training a model of the embodiments of the present disclosure.

FIG. 5 shows an exemplary block diagram of an electronic device 500 for implementing a method and apparatus of training a model of the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the device 500 includes a computing unit 501, which may execute various appropriate actions and processing according to computer programs stored in a read only memory (ROM) 502 or computer programs loaded into a random access memory (RAM) 503 from a storage unit 508. Various programs and data required for operations of the device 500 may further be stored in the RAM 503. The computing unit 501, the ROM 502 and the RAM 503 are connected to each other through a bus 504. An input/output (I/O) interface 505 is further connected to the bus 504.

A plurality of components in the device 500 are connected to the I/O interface 505, including: an input unit 506, such as a keyboard, a mouse, etc.; an output unit 507, such as various types of displays, speakers, etc.; the storage unit 508, such as a magnetic disk, an optical disk, etc.; and a communication unit 509, such as a network card, a modem, a wireless communication transceiver, etc. The communication unit 509 allows the device 500 to exchange information/data with other devices through a computer network such as the Internet and/or various telecommunication networks.

The computing unit 501 may be various general-purpose and/or special-purpose processing assemblies having processing and computing capabilities. Examples of the computing unit 501 include but are not limited to a central processing unit (CPU), a graphics processing unit (GPU), various special-purpose artificial intelligence (AI) computing chips, various computing units running machine learning model algorithms, digital signal processing (DSP), and any appropriate processor, controller, microcontroller, etc. The computing unit 501 implements the various methods and processes described above, for example, the method of training a model. For example, in some embodiments, the method of training a model may be implemented as computer software programs, which is tangibly contained in a machine-readable medium, such as the storage unit 508. In some embodiments, part of the computer programs or all of the computer programs may be loaded and/or installed on the device 500 via the ROM 502 and/or the communication unit 509. When the computer programs are loaded into the RAM 503 and executed by the computing unit 501, one or more operations of the method of training a model described above may be executed. Optionally, in other embodiments, the computing unit 501 may be configured to implement the method of training a model in any other suitable manner (for example, by means of firmware).

Various implementations of the systems and technologies described above may be implemented in digital electronic circuit systems, integrated circuit systems, field programmable gate arrays (FPGA), application specific integrated circuits (ASIC), application-specific standard products (ASSP), systems on a chip (SOC), complex programmable logic devices (CPLD), computer hardware, firmware, software, and/or a combination thereof. These various embodiments may include: the systems and technologies being implemented in one or more computer programs. The one or more computer programs may be executed and/or interpreted on a programmable system including at least one programmable processor. The programmable processor may be a special-purpose programmable processor or a general-purpose programmable processor that may receive data and instructions from a storage system, at least one input device, and at least one output device, and may transmit data and instructions to a storage system, at least one input device, and at least one output device.

Program codes for implementing the method of the present disclosure may be written in any combination of one or more programming languages. These program codes may be provided to processors or controllers of general-purpose computers, special-purpose computers, or other programmable data processing devices, so that the program codes, when executed by the processors or controllers, implement the functions/operations specified in the flowcharts and/or block diagrams. The program codes may be executed on a machine entirely, executed on a machine partly, executed on a machine partly as an independent software package and executed on a remote machine partly, or executed on a remote machine or server entirely.

In the context of the present disclosure, the machine-readable medium may be a tangible medium, which may contain or store programs used by an instruction execution system, an instruction execution apparatus, or an instruction execution device or used in combination with the instruction execution system, the instruction execution apparatus, or the instruction execution device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage media may include electrical connections based on one or more wires, portable computer disks, hard disks, random access memories (RAM), read only memories (ROM), erasable programmable read only memories (EPROM or flash memory), optical fibers, portable compact disk read only memory (CD-ROM), optical storage device, magnetic storage device, or any suitable combination of the above.

In order to provide interaction with the user, the systems and technologies described here may be implemented on a computer including a display device (for example, a CRT (Cathode Ray Tube) or LCD (Liquid Crystal Display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

We claim:

1. A method of training a model, comprising:
    acquiring a dialogue information input by a user in a human-machine interaction process;
    obtaining a corresponding predicted information based on the dialogue information by using a first intention recognition model, a first recurrent neural network, and a first named entity recognition model, wherein the predicted information includes: a user intention information, a dialogue state information and an entity information;
    obtaining a corresponding machine behavior information based on the predicted information by using a first behavior decision model, in order for a machine to perform a corresponding machine behavior in the human-machine interaction process based on the machine behavior information;
    acquiring a feedback information input by the user for the machine behavior;
    storing at least one of the predicted information, the machine behavior information, or the feedback information as training data in a database; and
    performing a model optimization training online based on the training data in the database by using a reinforcement learning algorithm, in response to an amount the training data in the database reaching a preset data amount, wherein
    the performing a model optimization training online based on the training data in the database by using a reinforcement learning algorithm, including, performing the model optimization training online on at least one of the first intention recognition model, the first recurrent neural network, the first named entity recognition model, or the first behavior decision model, based on the training data in the database by using the reinforcement learning algorithm, and
    the method further includes at least one of:
        performing an optimization training on a fully connected layer of the first intention recognition model, in performing the model optimization training on the first intention recognition model; and
        performing an optimization training on a fully connected layer of the first behavior decision model, in performing the model optimization training on the first behavior decision model.

2. The method of claim 1, wherein the performing a model optimization training online based on the training data in the database by using a reinforcement learning algorithm, comprising:
    selecting training data randomly from the database; and
    performing the model optimization training online based on the training data selected randomly, by using the reinforcement learning algorithm.

3. The method of claim 1, wherein the obtaining a corresponding predicted information based on the dialogue information by using a first intention recognition model, a first recurrent neural network and a first named entity recognition model, comprising at least one of:
    obtaining a probability distribution of a user intention based on the dialogue information by using the first intention recognition model;
    obtaining a probability distribution of a dialogue state based on the dialogue information by using the first recurrent neural network; and
    obtaining a corresponding entity vector based on the dialogue information by using the first named entity recognition model.

4. The method of claim 2, wherein the obtaining a corresponding predicted information based on the dialogue information by using a first intention recognition model, a first recurrent neural network and a first named entity recognition model, comprising at least one of:
    obtaining a probability distribution of a user intention based on the dialogue information by using the first intention recognition model;

obtaining a probability distribution of a dialogue state based on the dialogue information by using the first recurrent neural network; and obtaining a corresponding entity vector based on the dialogue information by using the first named entity recognition model.

5. The method of claim 1, wherein the obtaining a corresponding machine behavior information based on the predicted information, by using a first behavior decision model, comprising:

obtaining a probability distribution of the corresponding machine behavior based on the predicted information by using the first behavior decision model.

6. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 1.

7. The electronic device of claim 6, wherein the at least one processor is further configured to:

select training data randomly from the database; and perform the model optimization training online based on the training data selected randomly, by using the reinforcement learning algorithm.

8. The electronic device of claim 6, wherein the at least one processor is further configured to perform at least one of:

obtaining a probability distribution of a user intention based on the dialogue information by using the first intention recognition model;

obtaining a probability distribution of a dialogue state based on the dialogue information by using the first recurrent neural network; and obtaining a corresponding entity vector based on the dialogue information by using the first named entity recognition model.

9. The electronic device of claim 6, wherein the at least one processor is further configured to:

obtain a probability distribution of the corresponding machine behavior based on the predicted information by using the first behavior decision model.

10. A non-transitory computer-readable storage medium having computer instructions stored thereon, wherein the computer instructions are configured to cause a computer to implement the method of claim 1.

11. The non-transitory computer-readable storage medium of claim 10, wherein the computer instructions are further configured to cause a computer to:

select training data randomly from the database; and perform the model optimization training online based on the training data selected randomly, by using the reinforcement learning algorithm.

12. The non-transitory computer-readable storage medium of claim 10, wherein the computer instructions are configured to cause a computer to perform at least one of:

obtaining a probability distribution of a user intention based on the dialogue information by using the first intention recognition model;

obtaining a probability distribution of a dialogue state based on the dialogue information by using the first recurrent neural network; and obtaining a corresponding entity vector based on the dialogue information by using the first named entity recognition model.

13. The non-transitory computer-readable storage medium of claim 10, wherein the computer instructions are configured to cause a computer to:

obtain a probability distribution of the corresponding machine behavior based on the predicted information by using the first behavior decision model.

\* \* \* \* \*